United States Patent
Stollmaier et al.

(10) Patent No.: US 6,753,355 B2
(45) Date of Patent: Jun. 22, 2004

(54) LATEX CROSSLINKING WITH BLOCKED NITRILE OXIDES OR EPOXY SILANES

(75) Inventors: Friederike Stollmaier, Rheinmuenster (DE); James G. Kennedy, Hulst (NL)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/363,092

(22) PCT Filed: Sep. 21, 2001

(86) PCT No.: PCT/US01/29564

§ 371 (c)(1),
(2), (4) Date: Feb. 28, 2003

(87) PCT Pub. No.: WO02/26873

PCT Pub. Date: Apr. 4, 2002

(65) Prior Publication Data

US 2003/0229153 A1 Dec. 11, 2003

Related U.S. Application Data

(60) Provisional application No. 60/236,127, filed on Sep. 28, 2000.

(51) Int. Cl.$^7$ .................................................. C08J 9/30
(52) U.S. Cl. ............................................. 521/65; 521/71
(58) Field of Search ........................................ 521/65, 71

(56) References Cited

U.S. PATENT DOCUMENTS

| | | | |
|---|---|---|---|
| 3,399,080 A | 8/1968 | Vitkuske et al. | 117/155 |
| 3,404,116 A | 10/1968 | Pueschner et al. | 260/29.7 |
| 5,714,257 A | 2/1998 | Shah et al. | 428/391 |
| 6,468,613 B1 * | 10/2002 | Kitano et al. | |
| 6,596,379 B2 * | 7/2003 | McGee | |

FOREIGN PATENT DOCUMENTS

| | | | |
|---|---|---|---|
| JP | 2000-631439 | 8/2000 | C08J/9/28 |
| WO | WO 97/03034 | 1/1997 | |

* cited by examiner

*Primary Examiner*—Morton Foelak

(57) ABSTRACT

This invention concerns a composition useful for preparing latex foam. The composition includes a latex and a polynitrile oxide such as 2,4,6-triethylbenzene-1,3-dintrile oxide, or a latex and an epoxy silane, or a latex and a mixture of the two crosslinkers. The composition may also contain additional components, including fillers, surfactants, cell detackifiers, froth stabilizers, froth boosters, viscosity reducers, compounds to improve resilience and antioxidants. The composition is particularly useful in the manufacture of flooring, wall covering, shoe lining and non-woven materials.

20 Claims, No Drawings

LATEX CROSSLINKING WITH BLOCKED NITRILE OXIDES OR EPOXY SILANES

This application claims the benefit if Provisional Application No. 60/236,127 filed Sep. 28, 2000.

The invention relates to a novel composition containing latex and either a polynitrile oxide or an epoxy silane or a combination of the two, and a process using this composition in foam coating in the preparation of, for instance, flooring, wall covering, shoe lining, and non-woven materials.

Latex foam using high solids latex (HSL) crosslinked by sulfur vulcanization is well known. In certain applications, the latex is employed in the manufacture of flooring, wall covering, shoe lining and non-woven materials. The end user may add fillers to enhance desired properties prior to coating a given substrate with a foam layer made from the latex. New, improved latex compositions for foaming applications are highly sought, particularly compositions that provide crosslinking ability yet may be stored for extended periods of time, with crosslinking being initiated when desired.

The present invention provides a solution to one or more of the disadvantages and deficiencies described above.

In one broad respect, this invention is a composition comprising a carboxylated latex and either a polynitrile oxide or an epoxy silane, or a combination of the polynitrile oxide and epoxy silane, for crosslinking. In one embodiment, the latex is a carboxylated styrene-butadiene polymer. The latex may be bimodal. The composition may also contain various components to improve physical properties of the resulting foam. For example, the composition may include performance enhancing additives, such as paraffin wax and silicone detackifier. Advantageously, the latex composition may be supplied to the point of manufacture where inorganic or organic filler can be added to enhance desired properties. More advantageously, no additional curing pastes, gelling agents, accelerators or stabilizers are required in the practice of this invention. The emulsion, in one non-limiting embodiment, is stable for at least twelve months at ambient temperatures. During processing, the resulting foam will cross-link in the backing process to improve final end properties such that the product has sufficient strength. The present invention provides a simple means of preparing one-part coating systems that can be cured at room temperature without the release of by-products.

In another broad aspect, this invention is a process useful for forming an article of manufacture, comprising applying a foam to a substrate wherein the foam is formed from a composition comprising a latex and either a polynitrile oxide or an epoxy silane or a combination of the two. This process is particularly advantageous in applying a backing such as in the manufacture of flooring, wall covering, shoe lining, or non-woven material.

In another broad aspect, this invention is a structure that comprises a substrate attached to a latex foam that includes a polynitrile oxide, an epoxy silane, or a combination thereof. In one embodiment, this invention also encompasses an article of manufacture which comprises a substrate bonded to a latex foam, wherein the foam is also adhered to a second substrate to form a three-component structure, wherein the foam is made from the composition containing latex and either a dinitrile oxide or an epoxy silane or a combination of the two.

In another broad respect, this invention is a foam made by foaming a composition comprising latex and either polynitrile oxide or epoxy silane or a combination of the two.

A wide variety of latexes may be used in the practice of this invention. Representative monomers useful in preparing the latexes of this invention and methods for preparing the individual separate particles are well known, such as those described in U.S. Pat. Nos. 3,404,116 and 3,399,080, the teachings of which are incorporated herein by reference. Examples of suitable monomers for providing a carboxylate character include acrylic acid, methacrylic acid, itaconic acid, and fumaric acid. Examples of monomers suitable for preparing the latexes of this invention can include the olefins such as ethylene and propylene, vinyl acetate, alkyl acrylates, hydroxyalkyl acrylates, alkyl methacrylates, hydroxyalkyl methacrylates, acrylamide, n-methyloylacrylamides, as well as monomers such as vinyl chloride and vinylidene chloride. Especially preferred latexes include modified styrene/butadiene latexes such as, for example, styrene/butadiene/acrylic acid, styrene/butadiene/acrylic acid/itaconic acid, styrene/butadiene/vinylidene chloride, styrene/butadiene/beta-hydroxyethyl acrylate, styrene/butadiene/beta-hydroxyethylacrylate/acrylic acid, styrene/n-butylacrylate/acrylic acid, methyl methacrylate/n-butylacrylate/acrylic acid, vinyl acetate/acrylic acid, vinyl acetate/n-butylacrylate/acrylic acid, and/or styrene/n-butyl acrylate/butadiene/acrylic acid. Mixtures of carboxylic acids can be employed in the aforementioned latexes.

In the practice of this invention, one may employ carboxylated latex comprised of a copolymer of a vinyl aromatic monomer and an unsaturated carboxylic acid monomer. The copolymer may further comprise a diene monomer.

The vinyl aromatic monomer may be selected from styrene, alpha-methylstyrene, ethylstyrene, dimethylstyrene, t-butylstyrene, vinylnaphthalene, methoxystyrene, cyanostyrene, acetylstyrene, monochlorostyrene, dichlorostyrene, and other halostyrenes, and mixtures thereof. The vinyl aromatic monomer may be present in any effective amount. The vinyl aromatic monomer may be present in amounts of from approximately 0 to 75 percent by weight, based on the total weight of the polymer resin. In one embodiment, the vinyl aromatic monomer is present in amounts of from approximately 35 to 70 percent by weight. It is understood that the percentage of monomers in the final polymer will equal 100 percent.

The ethylenically unsaturated carboxylic acid may be a monocarboxylic acid, or a dicarboxylic acid or a polycarboxylic acid, such as, for example, acrylic acid, methacrylic acid, fumaric acid, maleic acid, itaconic acid, derivatives thereof, and mixtures thereof.

The ethylenically unsaturated carboxylic acid monomer may be present in amounts of from approximately 0.5 to 25 percent by weight, based on the total weight of the polymeric resin. In one embodiment, the ethylenically unsaturated acid monomer is present in amounts of from approximately 1 to 5 percent by weight and, in another embodiment, is from 3 to 5 percent by weight, based on the total weight of the copolymer.

The diene monomer, when present, may be selected from butadiene, isoprene, divinylbenzene, derivatives thereof and mixtures thereof. The 1,3-butadiene monomer is preferred. The diene monomer may be present in amounts of from 0 to 85 percent by weight, and in one embodiment is from 30 to 65 percent by weight, based on the total weight of the polymer resin.

The latex may comprise an additional ethylenically unsaturated monomeric component or components. Specific examples of such ethylenically unsaturated compounds include methyl methacrylate, ethyl acrylate, butyl acrylate, hexyl acrylate, 2-ethylhexyl acrylate, lauryl methacrylate, phenyl acrylate, acrylonitrile, methacrylonitrile, ethylchloroacrylate, diethyl maleate, polyglycol maleate, vinyl chloride, vinyl bromide, vinylidene chloride, vinylidene bromide, vinyl methyl ketone, methyl isopropenyl ketone, and vinyl ethyl ester. Derivatives thereof and/or mixtures thereof may be included.

The latex may comprise a styrene/butadiene/acrylic acid co polymer or a styrene/butadiene/hydroxy-ethylacrylate/ itaconic acid copolymer. The latex may also include a mixture of copolymers. A mixture of styrene/butadiene/ acrylic acid and styrene/butadiene/-hydroxyethylacrylate/ itaconic acid polymers in approximately equal amounts by weight may be used.

Such monomers are copolymerized in an aqueous emulsion containing surfactants and modifiers under conditions of time, temperature, pressure, and agitation in accordance with well known principles of emulsion polymerization.

The bimodal latexes that can be used in this invention may be characterized as having two separate and distinct particle size distributions, high solids content, good high shear rheology and good low shear viscosity. The bimodal latex used in this invention may comprise a proportion of large size latex particles and a proportion of small size latex particles. It is desirable to employ large size particles whose diameter is in the range of from 2.5 to 10, in one embodiment from 3 to 4, times the diameter of the small size particles. It is also desirable that the weight percentage of large size particles in the latex formulation exceeds the weight percentage of the small size particles. For example, a latex composition comprised substantially of styrenelbutadiene comprising from 50 to 98, and in one embodiment from 60 to 80, weight percent large size particles and from 2 to 50, and in another embodiment from 20 to 40, weight percent small size particles can be used. It is understood that the proportion of large size particles and the proportion of small size particles, the size distribution of particles, and the amount of solids in the formulation employed can depend on the particular latex which is employed and/or the particular coating device which is employed. For the bimodal latex, the large size latex particles can vary in size from 1500 Å to 10,000 Å, and in one embodiment from 1800 Å to 3000 Å in diameter; the small size latex particle can vary in size from 500 Å to 1000 Å, and in another embodiment from 600 Å to 800 Å in diameter.

Polynitrile oxides are known compounds. Representative, non-limiting examples of the polynitrile oxides that may be employed in the practice of this invention are disclosed in WO 97/03034 and references cited therein. Typically, in the practice of this invention, the polynitrile oxides contain aromatic functionality. The polynitrile oxides suitable for the practice of the present invention are hindered polynitrile oxides. The term "polynitrile oxide" is used herein to refer to two or more aromatic nitrile oxide groups per molecule. It is to be understood that the term "aromatic" includes heteroaromatic moieties such as pyridines, furans and thiophenes. The term "unsaturated" is used herein to denote a site of the type A=A', or A≡A', where A is a carbon atom, and A' is a carbon, oxygen, nitrogen, sulfur, or phosphorus atom. For the purposes of this invention, a nitrile oxide group is not an unsaturated group. The term "polyunsaturated" is used herein to denote more than one unsaturated group. The preferred unsaturated groups include olefins and alkynes. Each nitrile oxide is adjacent to at least one substituent that is 1) unreactive with nitrile oxide and 2) non-interfering with the reaction between the nitrile oxide groups and unsaturated groups, preferably olefinically or acetylenically unsaturated groups. Traditionally, nitrile oxides are prepared in situ in the presence of an unsaturated substrate with which the nitrile oxides are intended to react. However, the stable polynitrile oxide used as a curing agent in the present invention can be prepared separately and is sufficiently stable in the absence of the reactive substrate to be effective as a curing agent.

Preferably, the stable polynitrile oxide forms less than 10 percent, in one embodiment less than 5 percent, and in another embodiment less than 1 percent, dimers in 30 days at room temperature. Examples of hindered aromatic polynitrile oxides include:

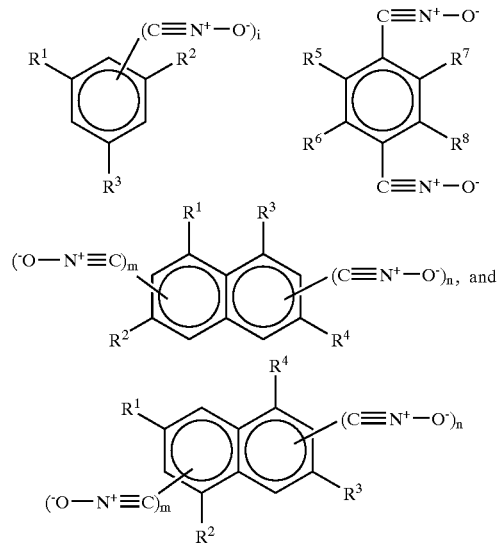

where $R^1$, $R^2$, and $R^3$, and $R^4$ are each independently H, R, halo, SH, SR, SOR, $SO_2R$, hydroxy, or OR, with the proviso that at least one of $R^1$, $R^2$, $R^3$, and $R^4$ that is adjacent to a nitrile oxide group is not H; $R^5$, $R^6$, $R^7$, and $R^8$ are each independently H, R, halo, S—H, SR, SOR, $SO_2R$, hydroxy, or OR, wherein R is a $C_1$–$C_{12}$ linear, branched, or cyclic alkyl group, preferably a $C_1$–$C_4$ linear or branched alkyl group, more preferably ethyl or methyl; or $R^5$ and $R^6$, or $R^7$ and $R^8$, together with the carbon atoms to which they are attached, form a benzene ring, wherein at least one of $R^5$ or $R^7$ is not H, and at least one of $R^6$ or $R^8$ is not H; i is 2 or 3; m and n are each 0, 1, or 2, and n+m is greater than or equal to 2, preferably 2 or 3.

Other examples of hindered aromatic polynitrile oxides include compound represented by the following structures:

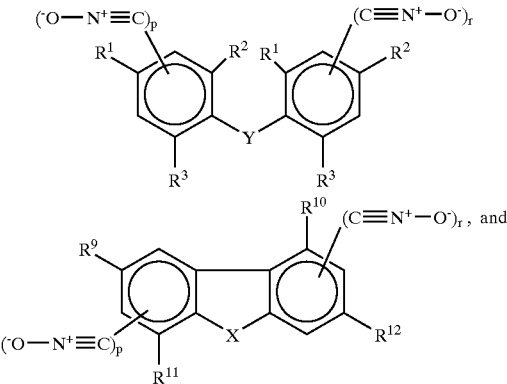

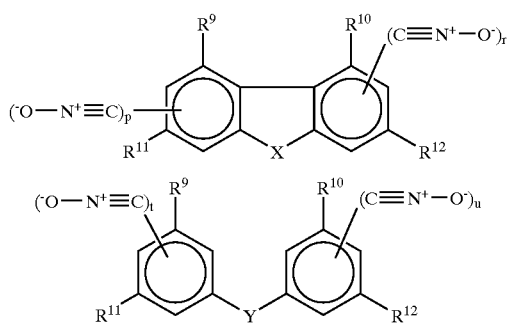

where $R^9$, $R^{10}$, $R^{11}$ and $R^{12}$ are each independently H, R, halo, SH, SR, SOR, $SO_2R$, hydroxy, or OR with the proviso that at least one of $R^9$ and $R^{11}$ is not H when a nitrile oxide group is adjacent to both $R^{10}$ and $R^{12}$, and at least one of $R^{10}$ and $R^{12}$ is not H when a nitrile oxide group is adjacent to both $R^{10}$ and $R^{12}$; m, p, and r are each 0, 1, or 2, and p+r is greater than 2; X is $CH_2$, $C(R)_2$, carbonyl, O, S, SO, $SO_2$, NH, $SO_2NH$, $SO_2NR$, or NR; t and u are each 0, 1, 2, or 3; and t+u great than or equal to 2; Y is a bond, $CH_2$, $C(R)_2$, carbonyl, O, S, SO, $SO_2$, NH, NR, 9,9'-fluoreno, or phenylene.

Examples of specific hindered aromatic polynitrile oxides that are suitable for the practice of the present invention include the following compounds:

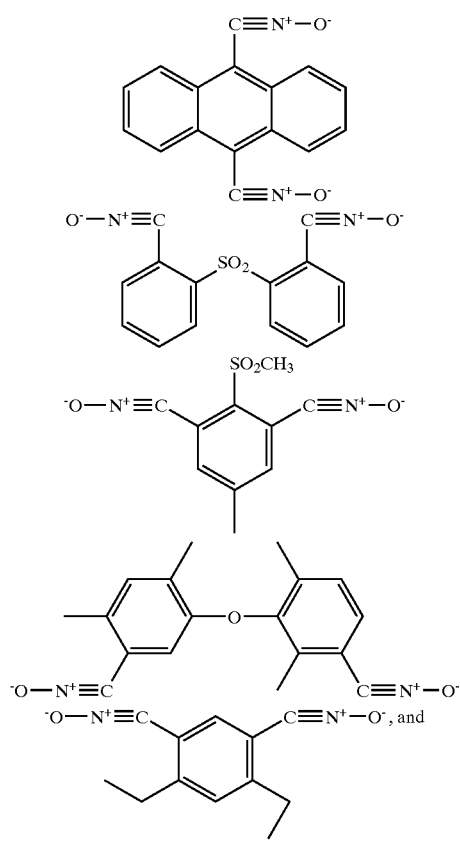

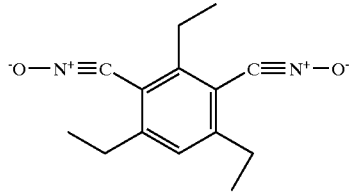

Stable aliphatic or cycloaliphatic polynitrile oxides can be prepared from a suitably functionalized aliphatic or cycloaliphatic polyaldehyde. The polyaldehyde can then be reacted with hydroxylamine to form the polyaldoxime, which can then be treated with bleach and caustic treatment to form the desired aliphatic polynitrile oxide.

A suitably functionalized aromatic mononitrile oxide or monoaldehyde can be used to prepare a polynitrile oxide represented by the following formula:

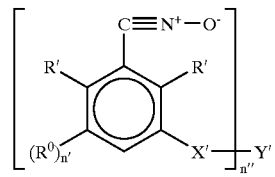

wherein each R' is independently $C_1$–$C_{12}$-alkyl, F, Cl, Br, I, O—($C_1$–$C_{12}$-alkyl), or S—($C_1$–$C_{12}$-alkyl); more preferably ethyl, methyl, n-propyl, isopropyl, n-butyl, isobutyl, methoxy, ethoxy; most preferably ethyl, methyl, or methoxy; each $R^O$ is a substituent that does not spontanoeously react with the nitrile oxide group, preferably ethyl, methyl, n-propyl, isopropyl, n-butyl, isobutyl, methoxy, ethoxy, F, Cl, Br, or I; each n' is mdepenently 0, 1, or 2; n' is an integer greater than 1, preferably 2, 3, or 4, more preferably 2 or 3, and most preperably 2; each X' is independently a bond or a connecting roup such as an alkylene, cycloalkylene, or arylene group, more preferably a bond, a methylene group, or a phenylene group; and Y' is a polyvalent radical, preferably a devalent radical, containing an ether, ester, amide, carbonate, ketone, urethane, arylene, or thioether group; or each X' and Y' together are a bond connecting the beuzene rings.

Functionalized hindered aromatic mononitrile oxides or monoaldehydes preferably include 2,6-disubstituted benzonitrile oxides or benzaldehydes having an ester, acetate, hydroxy, epoxy, fluorine, chlorine, bromine, or iodine group connected directly to the benzene ring or in directly through a connecting group. In one respect, the suitably functionalized 2,6-disubstituted benzonitrile oxide or benzaldehydes is represented by the following structure:

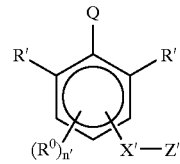

where R', $R^O$, X', and n' are previously defined; Q is —C≡$N^+$O— or —CHO; and Z' is an ester, acetate, amine, hydroxy, epoxy, amide, keto, aldehyde, fluorine, chlorine, bromine, or iodine group. For example, 3-hydroxymethyl-2,4,6-trimethylbenzonitrile oxide or its corresponding benzaldehyde precursor can be: (a) transesterified with a diester or condensed with a diacid chloride to form a dinitrile oxide diester; (b) reacted with phosgene to form a dinitrile oxide containing a carbonate group; (c) reacted with a diisocyanate to form a dinitrile oxide containing urethane groups; (d) reacted with a dibenzyl chloride to form a dinitrile oxide containing two ether groups; (e) reacted with a diglycidyl ether to form a dinitrile oxide containing ether groups and hydroxy groups reacted with an acid to form a dinitrile oxido dibenzyl ether.

Similarly, the functionalized hindered aromatic nitrile oxide can be reacted with a second suitably functionalized hindered aromatic nitrile oxide to form a dinitrile oxide. For example, 3-hydroxymethyl-2,4,6-trimethylbenzonitrile oxide can be reacted with 3-chloromethyl-2,6-dimethylbenzene nitrile oxide to form a bis(nitrile oxide) dimethyl ether.

Polynitrile oxides having a functionality of greater than 2 (for example, a trinitrile oxide) can readily be prepared by reacting a dinitrile oxide with a compound having more than 2 unsaturated sites. For example, 2,4,6-triethylbenzene-1,3-dinitrile oxide can be reacted with trimethylol propane triacrylate.

An aqueous dispersion of the stable polynitrile oxide is prepared, then combined with an aqueous dispersion of a polyunsaturated monomer or polymer or a combination thereof, to make a stable multi-component dispersion. The term "stable multi-component dispersion" is used herein to mean that microscopic mixing (and therefore, the reaction rate) of the polynitrile oxide and the polyunsaturated monomer and/or polymer is slower than it would be in the absence of the aqueous medium. In one embodiment, the extent of the reaction between the polynitrile oxide and polyunsaturated monomer and/or polymer dispersions is less than 10 percent in 8 hours, in another embodiment is less than 10 percent in 30 days, and in another embodiment is less than 10 percent in 1 year.

The aqueous dispersion of the polynitrile oxide can be prepared by emulsifying an emulsifiable concentrate of the polynitrile oxide. This concentrate can be prepared, for example, by mixing a solution of the polynitrile oxide with a surfactant. The polynitrile oxide may itself be prepared as a surfactant, for example, by reacting an excess of a dinitrile oxide with a polyunsaturated surfactant or, for example, by reacting a trinitrile oxide with a monounsaturated surfactant. Other methods of forming a polynitrile oxide surfactant include reacting the polynitrile oxide with a polymeric surfactant having polyunsaturation.

The epoxy silanes that may be employed in the practice of this invention may be generally described as epoxy-terminated silanes. These compounds are well known in the literature and are commercially available. These compounds have polymerizable (preferably terminal) epoxy groups and terminal, polymerizable silane groups. The epoxy and silane groups may be linked by non-hydrolyzable aliphatic, aromatic, or aliphatic and aromatic divalent hydrocarbon linkages which linkages may have nitrogen and/or oxygen atoms in the divalent group. For example, the oxygen atoms preferably are in the chain only as ether linkages. These linkage chains may be generally substituted as is well known in the art, as these substituents on the chain do not greatly affect the reactivity of the epoxy-terminated silanes. Representative examples of such substituents include —NO$_2$, alkyl, alkoxy, halogen, and so forth. A formula representative of epoxy silanes is:

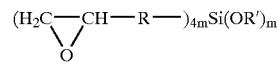

where R is a divalent hydrocarbon group of less than 20 carbons which may include one or more substituent groups (for instance, 2 or more ether linkages); R' is an aliphatic hydrocarbon radical of less than 10 carbon atoms or a radical of formula $(CH_2CH_2O)_kZ$ in which k is an integer of at least 1 and Z is an aliphatic hydrocarbon radical, with m being 1, 2 or 3 and typically being 3. Another representative formula is:

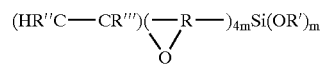

where R, R', and m are as described above, and wherein R" and R''' together form a cyclic structure such as a six-member hydrocarbon ring. In these formulas, R may be, for example, divalent hydrocarbon radicals such as methylene, ethylene, decalene, phenylene, cyclohexylene, cyclopentylene, methylcyclohexylene, 2-ethylbutylene, and allene or an ether radical such as —CH$_2$—CH$_2$—O—CH$_2$—CH$_2$—, —(CH$_2$—CH$_2$O)$_2$—CH$_2$—CH$_2$—, —X—O—CH$_2$—CH$_2$—, and —CH$_2$O—(CH$_2$)$_3$— where X is a divalent cyclohexane moiety. R' may be any aliphatic hydrocarbon radical of less than 10 carbon atoms such as methyl, ethyl, isopropyl, butyl, vinyl, alkyl, or any acyl radical of less than 10 carbon atoms such as formyl, acetyl, propionyl, or any radical of the formula $(CH_2CH_2O)_kZ$ in which k is an integer of at least 1 for example 2, 5, and 8 and Z is hydrogen or any aliphatic hydrocarbon radical of less than 10 carbon atoms such as methyl, ethyl, isopropyl, butyl, vinyl, and allyl. Representative examples of epoxy silanes that are currently available commercially include the Silquest™ epoxy silanes available from Witco Corporation.

Aqueous dispersions of polyunsaturated polymers are disperse polymers having a plurality of unsaturated sites, which dispersions can be prepared by emulsion polymerization of suitable monomers or by emulsification of previously prepared polymers (artificial latexes).

Suitable emulsion polymers can be prepared from the emulsion polymerization of alpha-olefinically unsaturated aromatic monomers and dienes, preferably conjugated dienes, such as styrene-butadiene latex, alpha-methylstyrene-butadiene latex, styrene-isoprene latex, and alpha-methylstyrene-isoprene latex.

However, the unsaturated latexes need not be prepared from conjugated diene monomers, but may be prepared by polymerizing or copolymerizing unsaturated monomers containing unsaturated groups having different reactivity. For example, the emulsion copolymerization of a monofunctional alkyl acrylate or methacrylate, such as methyl or butyl acrylate or methacrylate, with a difunctional acrylate or methacrylate having a vinyl group and less reactive double bond, such as crotyl acrylate or methacrylate, can produce a latex having a plurality of pendant olefin groups.

A suitably functionalized latex, which need not be unsaturated, may be post-reacted with compounds that impart unsaturated sites to the latex, for example, by reacting a latex containing carboxyl functionality, such as a poly(methylmethacrylate/butylmethacrylate/methacrylic acid) latex, with glycidyl methacrylate. Similarly, a latex containing pendant benzyl chloride groups can be reacted with a vinyl monomer containing a tertiary amine group to form the polyunsaturated latex.

Artificial latexes, particularly polyunsaturated triblock copolymers of unsaturated aromatic monomers and conjugated dienes, such as alpha-methylstyrene-butadiene-alpha-methylstyrene, alpha-methylstyrene-isoprene-alpha-methylstyrene, styrene-isoprene-styrene, and styrene-butadiene-styrene are also suitable.

Other suitable aqueous dispersions include those of polyester resins, such as maleate- and fumarate-containing polyesters and vinylically and allylically unsaturated acrylate copolyesters; butadiene-acrylonitrile copolymers; ethylene-propylene-dicyclopentadiene terpolymers; polyisoprene; polybutadiene, including 1,2-polybutadiene; unsaturated polyurethanes; and polyether copolymers and terpolymers containing at least two unsaturated epoxide constituents, such as propylene oxide-allyl glycidyl ether copolymers and ethylene oxide-epichlorohydrin-allyl glycidyl ether terpolymers.

Aqueous dispersions of polyunsaturated monomers include dispersions of conjugated or non-conjugated monomers, particularly monomers having a boiling point greater than 100° C. The polynitrile oxide or epoxy silane or mixtures of the two are used in amounts that are effective to cure the latex. In one embodiment, the concentration of polynitrile oxide is in the range of 0.01 to 10 nitrile oxide groups per unsaturated group. Advantageously, from 0.1 to 1.2 parts of the polynitrile oxide is employed per 100 dry parts latex, and preferably from 0.3 to 0.7 parts are employed. The epoxy silane is used at levels between 0.01 and 10 parts based on 100 dry parts latex, and preferably from 0.5 to 3 parts are employed. If a combination of polynitrile oxide and epoxy silane is employed, the combined amount is between 0.01 and 10 parts based on 100 parts dry of latex.

The curable latex composition according to the present invention may further include standard compounding ingredients such as, for example, fillers, thickening agents, antioxidants, dispersants, pH modifiers and flame retarding agents.

An adjustment of the pH of the mixture of the reactive latex and the co-reactive material may be made, if desired, by the addition of usual acidifying or alkalizing agents such as, for example, acetic acid, citric acid, dilute mineral acids, ammonium hydroxide and dilute aqueous solutions of alkali metal hydroxides.

The foaming step may be undertaken in any suitable or conventional manner. A foam or froth may be generated by methods well known in the art, for example by releasing a non-coagulating gas such as nitrogen, or by causing the decomposition of a gas-liberating material to chemically react with an ingredient in the mixture with the liberation of a non-coagulable gas as a reaction product. The mixture of the reactive latex and the co-reactive material is also foamed by whipping or by use of apparatus having commercially available foam heads. Known foaming aids, such as sodium lauryl sulfate, or foam stabilizers, such as potassium oleate, may be added if desired. Preferably, such added materials should be relatively non-reactive with the reactive group in the latex polymer or in the co-reactive material and thus the preference may vary with the composition of the mixture. Other soaps, emulsifiers, wetting agents, and surfactants, however, may be used, even though they may be reactive to a limited extent.

In addition to the latex and the polynitrile oxide and/or epoxy silane, the composition of this invention may comprise additional components and additives. Such additional components may include, but are not limited to, 0.1 to 10 parts per 100 dry parts of the latex, in one embodiment, 1 to 4 parts of a paraffin wax emulsion to improve cell tack and water resistance. The composition may include from 0.1 to 5 parts, in one embodiment 1 part, of a cell detackifier, such as a silicone based cell detackifier, used to prevent the cell walls of the foam from sticking together. The composition may include from 0.1 to 5 parts, in one embodiment 3 parts, of a froth stabilizer such as a suspension of disodium N-cetostearyl sulphosuccinimate. The composition may include from 0.1 to 5 parts, in one embodiment 1 part, of a froth booster. The composition may include from 0.1 to 2, in one embodiment 0.4 part, of a dispersant for any filler, if present, such as a polyphosphate dispersant added to improve dispersion of an inorganic (mineral) filler. The composition may include 0.1 to 2 parts, in one embodiment 0.5 part, of ammonium sulfate to reduce viscosity. The composition may include 0.1 to 10 parts, preferably 2 parts of the epoxy silane, which serves as an alternative cross-linker to dinitrile oxide. The composition may include a compound to improve resilience, such as 0.1 to 5 parts, in one embodiment is 1.5 parts, of ammonium oleate. The composition may include 0.1 to 5 parts of one or more antioxidants, such as 0.6 parts of a blend of a polymeric hindered phenol and a thioester.

The compositions of this invention may additionally comprise one or more mineral fillers. Examples of mineral fillers include those known in the art such as clay, titanium dioxide, carbon, silicates, zinc oxide, calcium carbonate, zinc sulfide, potassium titanate and titanate whiskers, glass flakes, clays, kaolin and glass fibers. The amount of filler which is employed can vary, depending upon the density of the filler and the coating properties desired. Each of the aforementioned components is mixed in an aqueous medium to yield a formulation which is 10 to 90 percent solids by weight.

The frothed mixture may be poured into molds, spread on a flat tray or belt, or coated onto substrates. For the purpose of this specification, the term "substrate" is defined as any material such as cloth, fabric, leather, wood, glass or metal or any form of backing such as for carpeting and shoes flooring, and wall covering, to which the frothed mixture will adhere when applied and after it is cured.

In a one embodiment of this invention in which the foam is used as a textile backing, the foam may be applied to the textile prior to drying and curing. A typical froth formed from the continuous foam will have a density in the range of from approximately 200 to 600 grams per liter in its wet state, preferably approximately 350 grams per liter. The foam may be applied to the substrate utilizing a doctor blade.

The drying and curing temperature may be any suitable temperature above ambient temperature. Indeed, some curing may occur at ambient temperature, but since the reaction time is extremely slow, such a temperature is impractical. In one embodiment, the temperature range is from approximately 110° C. to 180° C. The residence time is variable. Factors influencing residence time include temperature, film thickness, water content and the components of the curable coating composition. With temperatures in that range, a total residence time of approximately five to ten minutes has been found to be suitable. The drying and curing may be undertaken in a forced air circulation oven. The internal temperature of the oven may be maintained at or above approximately 120° C.

The following examples are illustrative of this invention and are not intended to be limit the scope of the invention or claims hereto. All percentages are by weight unless otherwise denoted.

EXAMPLE 1

A dispersion of 2,4,6-triethylbenzene-1,3-dintrile oxide (TON-2) was made by dissolving 16 grams of TON-2 in 48 grams of toluene, then adding this solution under high shear stirring to a solution of 2.28 grams DISPONIL FES31 surfactant in 61.72 grams of water. The resulting dispersion was stable.

The dispersion was added to a carboxylated styrene/butadiene latex (DL532, from The Dow Chemical Company) in differing amounts. The toluene was distilled off from the resulting TON-2/latex adduct at 200 mbar and 67° C. to give a stable dispersion. The samples before and after distilling off the toluene showed the same intensity of the nitrile oxide band in the IR (infrared) at 2290 cm−1.

A foam backing was prepared. The carboxylated styrene/butadiene latexes crosslinked with TON-2 were admixed with the following components in the noted proportions.

| Component | Amount | Description |
| --- | --- | --- |
| DL532 | 100 dry parts | carboxylated styrene/butadiene latex |
| TON-2 | 0.6 parts | crosslinker |
| IMPERMAX T-940 | 4 parts | paraffin wax to improve wet strength and abrasion resistance of the final product |
| PROSIL E-70 | 1 part | silicone based cell detackifier |
| EMPIMIN MKB | 3 parts | froth stabilizer, a suspension of disodium N-cetostearyl sulphosuccinimate |
| Sodium lauryl sulfate (SLS) | 1 part | froth booster |
| Calgon PT | 0.4 parts | a polyphosphate dispersant added to improve dispersion of a inorganic filler |
| Ammonium sulfate | 0.5 part | viscosity reducer |
| Ammonium oleate | 1.5 parts | improves resilience |
| Emulsion W Antioxidant | 1.2 parts | provides heat and UV light resistance, composed of a polymeric hindered phenol (WINGSTAY L) and a secondary antioxidant, Wingstay SN1 |

Next, this composition was mixed with a calcium carbonate filler to afford a composition containing 100 parts by dry weight of the latex/TON-2-composition,-160 parts by dry weight of calcium carbonate filler to afford a composition having 78 percent solids and a viscosity of 3,500 cPs (Brookfield spindle 4 at 20 rpm). The admixture was then mechanically foamed using air to reduce the density and dried in an oven at 140° C. for a minimum of 10 minutes to remove the water from the system.

Additional foams were prepared from TON-2 and DL532 latex. Three different mixtures of latex and TON-2 were employed, the mixtures having the following contents: mixture A bad 52.4 percent solids and 0.6 percent of TON-2; mixture B had 51.1 percent solids and 0.9 percent of TON-2 and mixture C had 50.2 percent solids and 1.2 percent of TON-2. The mixtures were combined with several additional components to provide the following:

TABLE 1

| Component | Solids (percent) | Dry parts | Wet parts | Batch (kg) |
| --- | --- | --- | --- | --- |
| Mixture A, B, and C | 52.4, 51.1, 50.2 | 100 | 190.8, 195.7, 199.2 | 724, 740, 753 |
| Emulsion W | 58 | 1.2 | 2.1 | 8 |
| SLS | 28 | 1 | 3.6 | 13.7 |
| Empimin MKB | 35 | 4.6 | 13.1 | 49.7 |
| Calgon PT | 20 | 0.5 | 2.5 | 9.5 |
| PROSIL E 70 | 100 | 1 | 1 | 3.8 |
| Impermax T940 | 60 | 8 | 13.3 | 50.5 |

TABLE 1-continued

| Component | Solids (percent) | Dry parts | Wet parts | Batch (kg) |
| --- | --- | --- | --- | --- |
| Calcium Carbonate | 100 | 180 | 180 | 683 |
| Methocel 228 | 4 | — | — | 39 |

Foams were prepared from the admixtures and the properties of the foams are shown in the following table.

TABLE 2

| Properties | Unit | Mixture A sample | Mixture B sample | Mixture C sample | DL 532 latex + epoxy (100 pts latex, 4 parts epoxy dry/dry)(for comparision) |
| --- | --- | --- | --- | --- | --- |
| Density | g/dm3 | 200 | 178 | 163 | 155 |
| Surface Structure | | Open cell N | Open cell N | Open cell N | Open cell F-N |
| Resilience min. | percent | 19 | 18 | 18 | 18 |
| Resilience max. | percent | 20 | 19 | 20 | 19 |
| Gauge retention | percent | 116 | 109 | 106 | 112 |
| Compression set | percent | 40 | 35 | 37 | 27 |
| Peak load | N | 3.2 | 2.87 | 2.7 | 4.1 |
| U.T.S. | N/nm2 | 0.034 | 0.031 | 0.031 | 0.047 |
| Elongation | percent | 109 | 95 | 98 | 184 |
| Total Solids Content (TSC) | percent | 71 | 70.3 | 69.1 | 71 |
| Viscosity (unfoamed) | cps (4, 20) | 5,800 | 3,950 | 3,890 | 4,200 |

In this table it can be seen that the structure of the foams from Mixtures A, B and C is slightly coarser than the DL 532 reference (N=normal structure; F—N=fine to normal structure). The resilience of the foam samples for Mixtures A, B and C are similar to the DL 532. The elongation for the foam made with epoxy (the DL 532 sample) was higher, indicating less crosslinking. The ultimate tensile strength (U.T.S.) and the peak load are lower for the samples with TON-2, however.

EXAMPLE 2

90 grams of TON-2 was dissolved in 270 grams of toluene. The solution was filtered through a paper filter. The filter cake was washed with 20 grams of toluene and the filtrate added to the solution. 360 grams of solution were obtained with a solids content of 15.7 percent. 12.82 grams DISPONIL FES 32 (28 percent) were dissolved in 347.18 g deionized water. Then, the first solution was dropped into the second solution under high shear stirring using a Dispermat N1, available from Hediger Verfahrenstechnik, Switzerland. A stable emulsion containing 7.85 percent TON-2 was obtained.

Samples of carboxylated styrene-butadiene latex DL 532 were modified with the TON-2. The samples were prepared by adding the TON-2 emulsion to the latex under stirring and removing the toluene by steam distillation in vacuum at 200 mbar and 61° C. For each 2 kg sample, 1 kg of water condensate was removed. The amount of TON-2 was added in varying amounts so as to yield the following:

Sample 1, 0.3 percent TON-2 dry based on 100 parts dry latex;

Sample 2, 0.6 percent TON-2 dry based on 100 parts dry latex;

Sample 3, 0.9 percent TON-2 dry based on 100 parts dry latex;

Sample 4, 1.2 percent TON-2 dry based on 100 parts dry latex and

Sample 5, 3.2 percent TON-2 dry based on 100 parts dry latex;

Gel content and swelling index measurements were made with films of wet thickness of 300 microns dried at room temperature for 1 hour and cured for 30 minutes at 130° C. The films were swollen in THF (tetrahydrofuran). The mean value of two determinations is as follows:

TABLE 3

| Sample | Gel Content (percent) | Swelling Index (percent) |
|---|---|---|
| Control - (no TON-2) | 75 | 12 |
| 1 | 78 | 8 |
| 2 | 86 | 8 |
| 3 | 87 | 7 |
| 4 | 92 | 6 |

Due to the increasing gel content and decreasing swell index, it can be seen that crosslinking increases with an increase in TON-2 level.

A foam was prepared using Sample 5 and the other components listed in the following table.

TABLE 4

| Formulation components | Percent Solids | Dry Parts | Wet Parts | Batch Size |
|---|---|---|---|---|
| Sample 5 | 56 | 100 | 176 | 1575 |
| Emulsion W | 58 | 1.5 | 2.6 | 23.3 |
| SLS | 28 | 1.0 | 3.57 | 32 |
| Empimin MKB | 35 | 4.6 | 13.1 | 117 |
| Calgon PT | 50 | 0.5 | 1.0 | 8.95 |
| Prosil E 70 | 100 | 1.0 | 1.0 | 8.95 |
| Impermax | 60 | 8.0 | 13.3 | 119 |
| Filler BL200 | 100 | 180 | 180 | 1611 |
| Methocel ™ 228 | 3.5 | 0.75 | 21.3 | 190 |

The resilience of the resulting foam increased versus a control sample even at lower TON-2 levels, as evidenced by the additional foams that were made using Samples 1–4, shown in the following table, using the proportions in the immediately preceding table. In the following table, "UTS" refers to ultimate tensile strength and "TEA" refers to total energy absorbed.

TABLE 5

| Sample | Peak Load (Newton) | UTS (N/mm3) | Elongation (percent) | TEA | Resilience (percent) | Density (g/l) |
|---|---|---|---|---|---|---|
| 1 | 1.729 | 0.027 | 90 | 0.109 | 20–21 | 145 |
| 2 | 3.109 | 0.032 | 90 | 0.191 | 22–24 | 170 |
| 3 | 3.916 | 0.042 | 60 | 0.164 | 24–25 | 216 |
| 4 | 4.030 | 0.042 | 70 | 0.208 | 24–25 | 190 |

Latexes cross-linked with TON-2 seem to need an initially higher elongation to retain enough elongation after cross-linking with TON-2. A final elongation of approximately 180 percent is preferred, presently.

EXAMPLE 3

Epoxy silane, for example, Silquest™ Wetlink 78 from Witco Corporation was added to a carboxylated latex (DL 532, from The Dow Chemical Company) in differing amounts. A foam backing was prepared. The carboxylated styrene/butadiene latexes crosslinked with Wetlink 78 were admixed with the following components in the noted proportions.

A foam backing was prepared. The carboxylated styrene/butadiene latexes crosslinked with Wetlink 78 epoxy silane were admixed with the following components in the noted proportions.

| Component | Amount | Description |
|---|---|---|
| DL532 | 100 dry parts | carboxylated styrene/butadiene latex |
| Wetlink 78 Epoxy silane | 0.5–2.0 parts | crosslinker |
| IMPERMAX T-940 | 4 parts | paraffin wax to improve wet strength and abrasion resistance of the final product |
| PROSIL E-70 | 1 part | silicone based cell detackifier |
| EMPIMIN MKB | 3 parts | froth stabilizer, a suspension of disodium N-cetostearyl sulphosuccinimate |
| SLS | 1 part | froth booster |
| Calgon PT | 0.4 parts | a polyphosphate dispersant added to improve dispersion of a inorganic filler |
| Emulsion W Antioxidant | 0.6 parts | provides heat and UV light resistance, composed of a polymeric hindered phenol (WINGSTAY L) and a secondary antioxidant, Wingstay SN1 |

Next, this composition was mixed with a calcium carbonate filler to afford a composition containing 100 parts by dry weight of the latex/epoxy silane composition, 160 parts by dry weight of calcium carbonate filler to afford a composition having 78 percent solids and a viscosity of 3,500 cPs (Brookfield spindle 4 at 20 rpm). The admixture was then mechanically foamed using air to reduce the density and dried in an oven at 150° C. for a minimum of 10 minutes to remove the water from the system.

Additional foams were prepared from epoxy silane and DL 532 latex. Four different mixtures of latex and epoxy silane were employed, the mixtures having the following contents:

Mix 3A—100 dry parts of DL 532 latex and 0.5 parts dry epoxy silane

Mix 3B—100 dry parts of latex and 1.0 parts dry epoxy silane

Mix 3C—100 dry parts of latex and 1.5 parts dry epoxy silane

Mix 3D—100 dry parts of latex and 2.0 parts epoxy silane

The mixtures were combined with several additional components to provide the following:

TABLE 6

| Component | Solids (percent) | Dry parts | Wet parts | Batch (kg) |
|---|---|---|---|---|
| Mixture 3A, 3B, 3C, 3D | 56.0 | 100 | 178.5 | 724 |
| Emulsion W | 58 | 0.6 | 2.1 | 8 |
| SLS | 28 | 1 | 3.6 | 13.7 |
| Empimin MKB | 35 | 3.5 | 13.1 | 49.7 |
| Calgon PT | 20 | 0.4 | 2.5 | 9.5 |
| Prosil E 70 | 100 | 1 | 1 | 3.8 |
| Impermax T940 | 60 | 4 | 6.6 | 50.5 |
| Calcium Carbonate | 100 | 180 | 180 | 683 |
| Methocel 228 | 4 | — | — | 39 |

Foams were prepared from the admixtures and the properties of the foam are shown in the following table.

TABLE 7

| Properties | Unit | Mixture 3A sample with 0.5 parts epoxy silane/100 parts dry latex | Mixture 3B sample with 1.0 parts epoxy silane/100 parts dry latex | Mixture 3C sample 1.5 parts epoxy silane/100 parts dry latex | Mixture 3D sample 2.0 parts epoxy silane/100 parts dry latex |
|---|---|---|---|---|---|
| Density | g/dm3 | 220 | 231 | 214 | 220 |
| Surface Structure | | Open cell F-N | Open cell F-N | Open cell F-N | Open cell F-N |
| Resilience min. | percent | 20 | 21 | 22 | 21 |
| Resilience max. | percent | 21 | 23 | 24 | 23 |
| Gauge retention | percent | 110 | 116 | 115 | 112 |
| Compression set | percent | 25 | 16 | 18 | 12 |
| Peak load | N | 2.2 | 2.7 | 2.9 | 4.1 |
| U.T.S. | N/nm2 | 0.067 | 0.079 | 0.096 | 0.100 |
| Elongation | percent | 115 | 121 | 112 | 130 |
| TSC | percent | 74.0 | 74.5 | 74.3 | 74.2 |
| Viscosity (un-foamed) | cps (4, 20) | 3,600 | 3,500 | 3,690 | 3,550 |

From this table it can be seen that the properties of the foams from Mixtures 3A, 3B, 3C and 3D are comparable to properties of the reference made with epoxy emulsion (see Example 1). The elongation and ultimate tensile strength (UTS) for the foam made with 2.0 parts was highest indicating optimum crosslinking strength.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A composition useful for preparing a latex foam, comprising: a latex; a froth stabilizer; and a polynitrile oxide, or an epoxy silane, or a combination thereof; and, optionally, a paraffin wax emulsion, a cell detackifier, a froth booster, a dispersant, a resilience enhancer, an antioxidant, or any combination thereof.

2. The composition of claim 1 further comprising a filler.

3. The composition of claim 1 wherein the latex is a carboxylated styrene-butadiene latex.

4. The composition of claim 1 wherein the latex is styrene/butadiene/acrylic acid, styrene/butadiene/acrylic acid/itaconic acid, styrene/butadiene/betahydroxyethylacrylate/acrylic acid, styrene/n-butylacrylate/acrylic acid, methyl methacrylate/n-butylacrylate/acrylic acid, vinyl acetate/acrylic acid; vinyl acetate/n-butylacrylate/acrylic acid, styrene/n-butyl acrylate/butadiene/acrylic acid or combination thereof.

5. The composition of claim 1 wherein the latex is a bimodal latex.

6. The composition of claim 1 wherein the polynitrile oxide is a dinitrile oxide.

7. A process useful for forming an article of manufacture, comprising applying a foam coating to a substrate wherein the foam is formed from a composition comprising a latex and a polynitrile oxide, or an epoxy silane, or a combination thereof and, optionally, a paraffin wax emulsion, a cell detackifier, a froth stabilizer, a froth booster, a dispersant, a resilience enhancer, an antioxidant, or any combination thereof.

8. The process of claim 7 wherein the composition further comprises a filler.

9. The process of claim 7 wherein the latex is styrene/butadiene/acrylic acid, styrene/butadiene/acrylic acid/itaconic acid, styrene/butadiene/betahydroxyethylacrylate/acrylic acid, styrene/n-butylcrylate/acrylic acid, methyl methacrylate/n-butylacrylate/acrylic acid, vinyl acetate/acrylic acid, vinyl acetate/n-butylacrylate/acrylic acid, styrene/n-butyl acrylate/butadiene/acrylic acid or combination thereof.

10. The process of claim 7 wherein the latex is a bimodal latex.

11. The process of claim 7 wherein the latex is a carboxylatad styrene-butadiene latex.

12. The ptocess of claim 7 wherein the polynitrile oxide is a dinitrile oxide.

13. A composition useful for preparing a latex foam, comprising: a latex; a froth stabilizer, and a polynitrile oxide, or an epoxy silane, or a combination thereof.

14. The composition of claim 13 wherein the latex is prepared from monomers comprising a carboxylic acid, styrene and butadiene.

15. The composition of claim 14 wherein the oxide is a dinitrile oxide.

16. The composition of claim 14 comprising the latex, froth stabilizer, epoxy silane, and essentially no polynitrile oxide.

17. The composition of claim 14 comprising the latex, froth stabilizer, polynitrile oxide, and essentially no epoxy silane.

18. The composition of claim 14 comprising the latex, froth stabilizer, polynitrile oxide, and epoxy silane.

19. The composition of claim 14 further comprising a filler.

20. The composition of claim 19 wherein the filler comprises calcium carbonate.

* * * * *